US006981303B2

(12) United States Patent
Nakao et al.

(10) Patent No.: US 6,981,303 B2
(45) Date of Patent: Jan. 3, 2006

(54) BLANK FEEDING METHOD

(75) Inventors: Yasuhiro Nakao, Sayama (JP); Hiroto Shoji, Sayama (JP); Kunitoshi Sugaya, Sayama (JP); Takashi Kato, Sayama (JP); Takaharu Echigo, Sayama (JP); Satoshi Matsuura, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 172 days.

(21) Appl. No.: 10/484,304

(22) PCT Filed: Jul. 23, 2002

(86) PCT No.: PCT/JP02/07420

§ 371 (c)(1), (2), (4) Date: Jan. 20, 2004

(87) PCT Pub. No.: WO03/009958

PCT Pub. Date: Feb. 6, 2003

(65) Prior Publication Data

US 2004/0194274 A1 Oct. 7, 2004

(30) Foreign Application Priority Data

Jul. 23, 2001 (JP) ............................. 2001-221279
Jul. 23, 2001 (JP) ............................. 2001-221330

(51) Int. Cl.
*B23P 17/00* (2006.01)

(52) U.S. Cl. .......................................... 29/415; 29/417

(58) Field of Classification Search .................. 29/415, 29/417, 412, 411, 527.6, 527.5, 530; 266/902; 65/305

See application file for complete search history.

(56) References Cited

U.S. PATENT DOCUMENTS 5,001,918 A * 3/1991 Stepanenko et al. .......... 72/133

FOREIGN PATENT DOCUMENTS

| | | |
|---|---|---|
| JP | HEI-5-78360 | 10/1993 |
| JP | 3088845 | 12/1993 |
| JP | 6-198413 | 7/1994 |
| JP | 9-192922 | 7/1997 |
| JP | 10-180428 | 7/1998 |
| JP | 10-261736 | 9/1998 |
| JP | 11-123502 | 5/1999 |
| JP | 2001-321871 | 11/2001 |

* cited by examiner

*Primary Examiner*—John C. Hong
(74) *Attorney, Agent, or Firm*—Rankin, Hill, Porter & Clark LLP

(57) ABSTRACT

A method of feeding a blank (31) by cutting a billet (11) for plastic working includes the steps of superimposing a plurality of annular members (15 to 18) having a coefficient of linear expansion smaller than that of the billet and an inside diameter slightly greater than the outside diameter of the billet on one another to assemble a tubular jig (12), inserting the billet into the assembled jig, heating the billet and the jig to a temperature at which the billet is half-molten, and cutting the billet into at least one blank by moving the annular members adjacent to one another in opposite directions. The cutting of the billet does not need a cutting tool, thus causing no wear of blades, and thereby allowing reduction in production cost. The billet can be cut into a plurality of pieces at a time, increasing productivity. Since the blanks can be fed together with the annular members, there is no need to reheat the blanks, providing increased productivity.

6 Claims, 9 Drawing Sheets

BLANK FEEDING METHOD

TECHNICAL FIELD

The present invention relates to a blank feeding method in which a billet for use in plastic working is cut into blanks of a predetermined thickness and the cut blanks are fed to a press molding device.

BACKGROUND ART

A method of cutting a billet into blanks is disclosed in, for example, ① Japanese Patent Laid-Open Publication No. 2001-321871, "Method of Press Molding Aluminum-based-composite Disc-like Parts." A method of feeding blanks heated to a predetermined temperature is disclosed in, for example, ② Japanese Patent Laid-Open Publication No. HEI-6-198413, "Solid-liquid-coexisting-range Die Casting Method."

The press molding method of the conventional art ① will be described below with reference to FIG. 12.

First, alumina ($Al_2O_3$) powder is formed into a predetermined shape in advance, being a porous alumina compact. Then, the compact is reduced and a molten aluminum alloy is infiltrated into the reduced porous structure, producing an aluminum-based-composite billet 101.

The aluminum-based-composite billet 101 is successively cut by a cutter 102 to a predetermined thickness t, forming a blank material 103 of the aluminum-based composite. Then, the blank material 103 is placed on a metal mold for molding.

In the cutting method of the conventional art ①, however, the cutter 102 cuts the aluminum-based-composite billet 101 with the blade of the cutter 102 wearing away soon, increasing the frequency of replacement of the cutter 102, and increasing production cost. The increased frequency of replacement of the worn-out cutter 102 lengthens the stop time of the cutting machine, resulting in poor productivity. Further, a machining allowance corresponding to the width dimension of the cutter 102 is required, reducing the yield of the expensive aluminum-based composite.

The die casting method of the conventional art ② comprises the following steps:

(a) first, a round bar is cut at a predetermined length, and a cut material is put into a metal container with its internal surface coated in advance with a mold release agent;

(b) then, the material put in the container is heated in a heating furnace to a solid-liquid coexisting temperature range of the material. After the heating, the container containing the material is put out from the furnace and is carried to a sleeve insertion opening; and (c) finally, the container is upset (inverted 180°), letting only the material fall into the sleeve, thus injecting the heated material into a mold cavity.

The use of the die casting method, however, requires the step of inverting the container after heating the container to let the material fall from the container, taking time for handling the material, and resulting in poor productivity. Further, the cutting work of cutting the round bar to a predetermined length of materials, producing a plurality of materials from the single round bar takes time. Especially with a round bar of a hard-to-cut material, the work takes time, increasing production cost.

DISCLOSURE OF THE INVENTION

It is an object of the present invention is to provide a blank feeding method which allows increased productivity and thus allows reduced production cost.

According to the present invention, there is provided a method of feeding a blank by cutting a billet for plastic working, which comprises the steps of: superimposing a plurality of annular members having a coefficient of linear expansion smaller than that of the billet and an inside diameter slightly greater than the outside diameter of the billet on one another to assemble a tubular jig; inserting the billet into the assembled jig; heating the billet and the jig to a temperature at which the billet is half-molten; and cutting the billet into at least one blank by moving the annular members adjacent to one another in opposite directions.

The billet expands by heating, eliminating clearance, contacting at its outer peripheral surface to the inner surface of the jig, and causing a compressive force on the billet. With the compressive force, the jig holds the billet so as to prevent its moving inside the jig, causing no sliding in the axis direction, and facilitating the cutting in the subsequent step. Heating the billet to a half-melting temperature together with the jig reduces the shearing resistance of the billet. As a result, the cutting of the billet in the following step is facilitated.

In the step of cutting the billet into the blank, the billet is cut by half-melting the billet and moving the adjacent annular members in the opposite directions, which eliminates the need for a cutting tool such as a cutter. As a result, there occurs no wear of blades caused by using a cutting tool such as a cutter, incurring no purchase cost of cutting tools.

Since the billet is half-melt and the adjacent annular members are moved in the opposite directions, thereby to cut the billet, there is no need to provide a machining allowance for cutting. As a result, yields of the billet are increased, reducing production cost.

Further, since the billet is half-melt and the adjacent annular members are moved in the opposite directions, thereby to cut the billet, the jig can cut the billet into a plurality of blanks at a time, increasing productivity.

In the step of disposing the blank on a press molding device, the blank, being fitted in the annular member, is carried to the press molding device, so that the blank can be disposed on the press molding device before the temperature of the blank decreases, eliminating the need for reheating the blank before molding.

In addition, since the blank, being fitted in the annular member, is fed to the press molding device, a locating portion of the annular member can be brought to a locating portion of the press molding device, setting the blank in a predetermined position, and facilitating the positioning of the half-molten blank.

In a preferred embodiment of the present invention, the blank feeding method further comprises the step of disposing the blank, being fitted in the annular member, on the press molding device.

The press molding device preferably has a mold half having fitting holes for receiving the plurality of annular members with the blanks fitted therein, and the blank disposing step comprises fitting the plurality of annular members into the fitting holes.

In another preferred embodiment of the present invention, the annular member has a grip protruding outward of an outer peripheral surface, and the blank disposing step includes carrying the annular member to the press molding device by holding the grip.

The heating may be performed by an induction heating method. With this, the heating time of the billet is shortened and the cycle time of the heating step is shortened.

The billet is preferably formed with an aluminum-based composite. The aluminum-based composite is cut by inserting the aluminum-based composite into the jig and moving the adjacent annular members in the opposite directions, which eliminates the need for a cutting tool for cutting the aluminum-based composite. As a result, no cost occurs for purchasing cutting tools to be subjected to severe wear for the aluminum-based composite. Further, since the aluminum-based composite is cut by moving the adjacent annular members in the opposite directions, no cutting tool is necessary for cutting the aluminum-based composite. As a result, there is no need to provide a machining allowance for cutting, increasing the yield of the expensive aluminum-based composite.

The jig is preferably formed with austenitic stainless steel. With this, an induction heating method can inductively heat only the billet without inductively heating the austenitic stainless steel, enlarging the expansion difference, and increasing the compressive stress of the billet. As a result, the cutting in the subsequent step is facilitated. The use of the austenitic stainless steel can apply a compressive force to the aluminum-based composite inside the jig by the thermal expansion difference because the coefficient of linear expansion of the austenitic stainless steel is smaller than the coefficient of linear expansion of the aluminum-based composite.

BEST MODE FOR CARRYING OUT THE INVENTION

Figure 1:
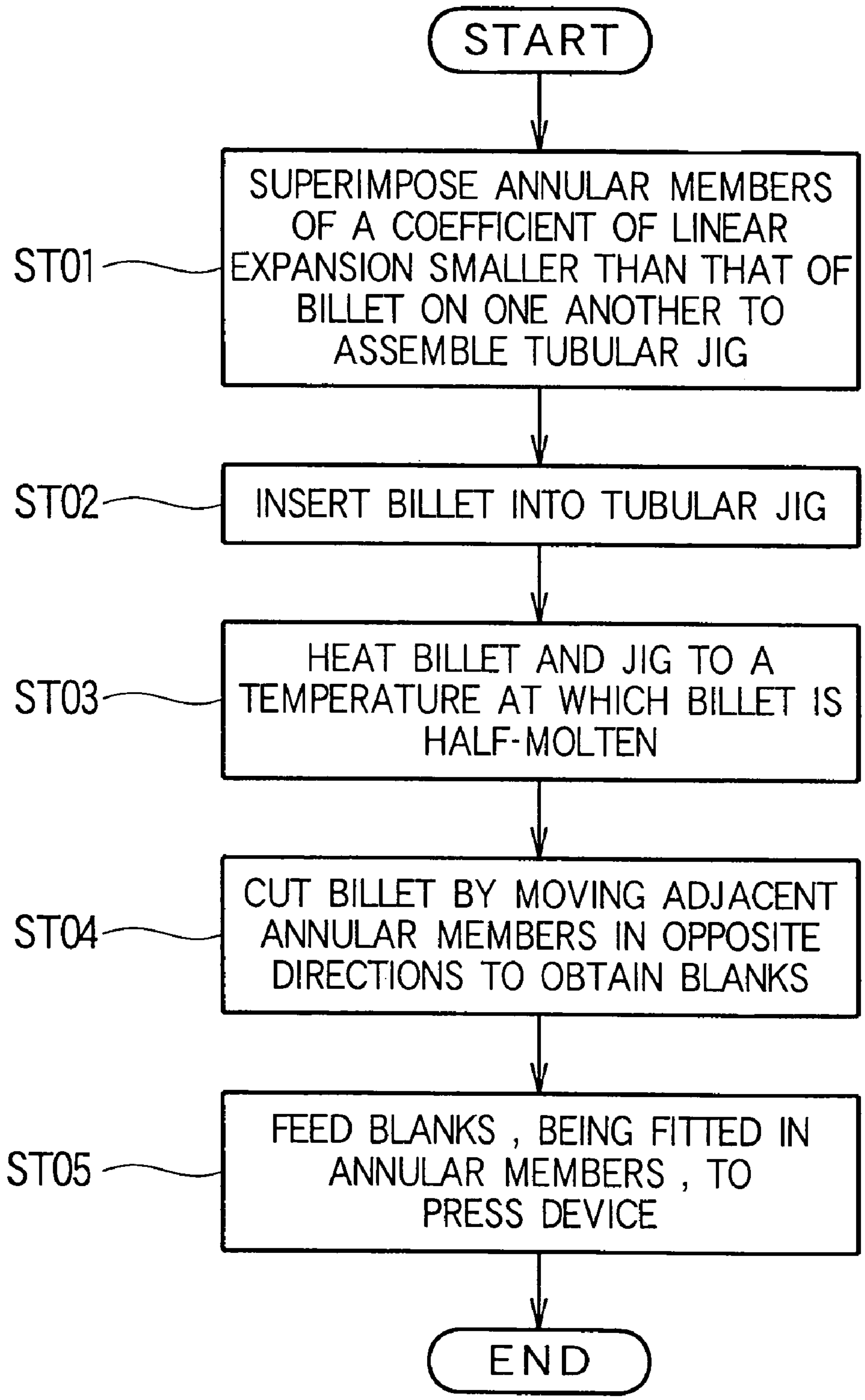
FIG. 1 is a flowchart of a blank feeding method according to the present invention.
Figure 2:
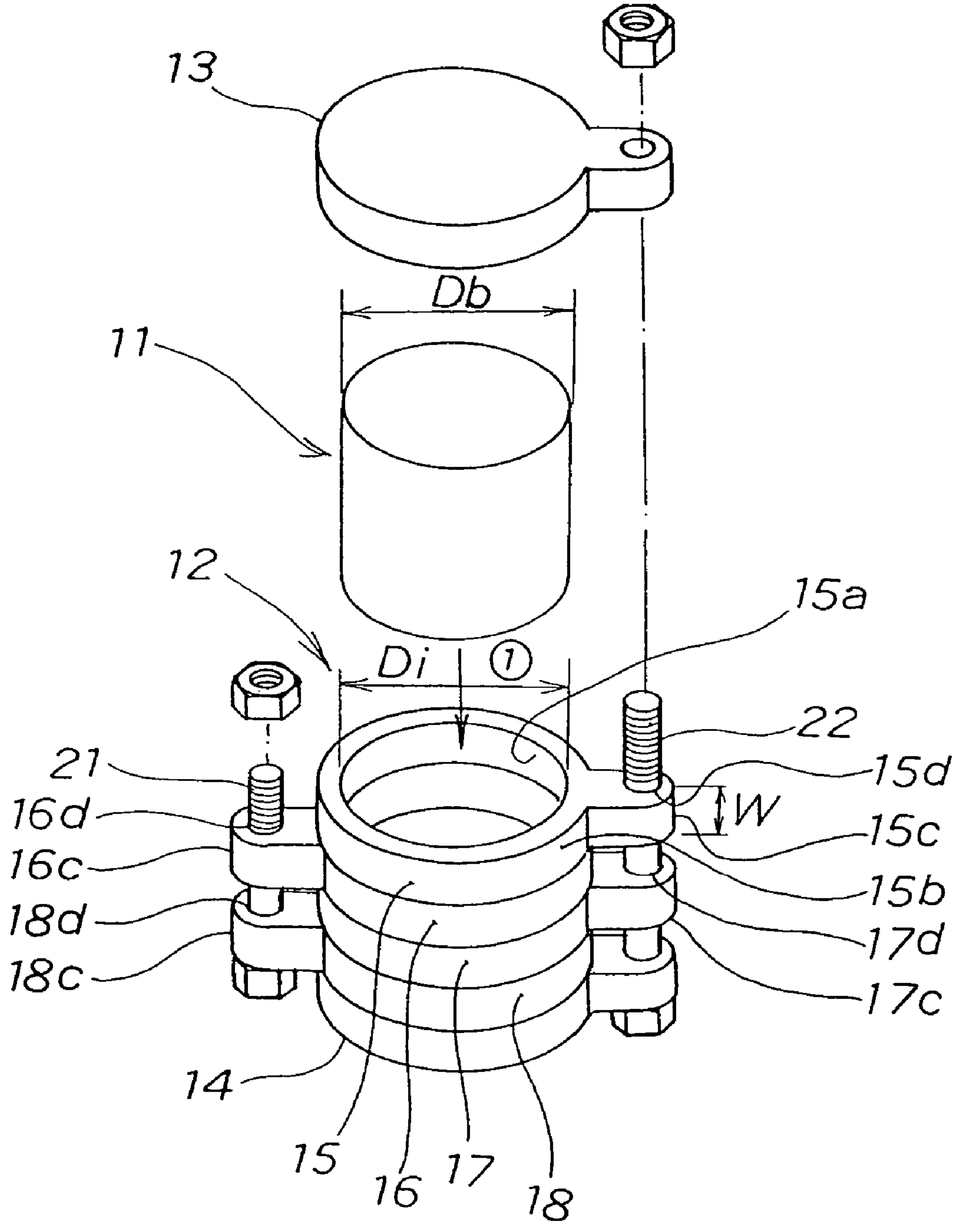
FIG. 2 is a schematic perspective view illustrating an assembling step of a jig used for cutting a billet and a billet inserting step.

A blank feeding method according to the present invention will be described with reference to FIGS. 1 and 2. In FIG. 1, ST denotes a step.

First, annular members 15 to 18 having a coefficient of linear expansion smaller than that of a billet 11 are superimposed on one another, assembling a tubular jig 12 (ST01). Then, the billet 11 is inserted into the tubular jig 12 (ST01). Thereafter, the billet 11 and the jig 12 are heated to a temperature at which the billet 11 is half-molten (ST03). Successively, the adjacent annular members 15 to 18 are moved in opposite directions, thereby cutting the billet 11 into blanks 31 of a predetermined dimension (ST04). Finally, the blanks 31, being fitted in the annular members 15 to 18, are disposed on a press molding device 32 (ST05).

Now ST01 to ST05 will be described in more detail especially with reference to FIG. 2.

First, the jig 12 used for cutting the billet 11 is assembled. Specifically, the jig 12 consists of circular press plates 13 and 14 provided at its opposite ends for holding the opposite ends of the billet, the first annular member 15, the second annular member 16, the third annular member 17 and the fourth annular member 18 arranged in a superimposing manner between the press plates 13 and 14, and bolts 21 and 22 for uniting those annular members. The first to fourth annular members 15 to 18 are superimposed on the press plate 14 and the bolts are fastened, thereby assembling the tubular jig 12.

The first annular member 15 has an inner peripheral portion 15*a* of an inside diameter Di slightly greater than the outside diameter Db of the billet 11. An outer peripheral portion 15*b* outside the inner peripheral portion 15*a* is provided with a grip 15*c* of a width W. The grip 15*c* has a hole 15*d*.

The first annular member 15 is formed with a material such as austenitic stainless steel (e.g., JIS SUS304) having a coefficient of linear expansion smaller than that of the billet 11. The second to fourth annular members 16 to 18 are each identical with the first annular member 15 and will not be described. Reference signs 16*c* to 18*c* denote grips of the second to fourth annular members 16 to 18, and 16*d* to 18*d* denote holes of the annular members 16 to 18.

The billet 11 is formed with an aluminum-based composite, for example.

The aluminum-based composite is made, for example, by forming in advance alumina ($Al_2O_3$) powder into a porous alumina compact of a predetermined shape, reducing the alumina compact under an atmosphere of magnesium nitride, exposing the metal for good wettability, and infiltrating a molten aluminum alloy into the porous structure. The aluminum-based composite thus has good formability with the aluminum and the reinforcing material firmly combined at an interface threrebetween by chemical contact.

The billet 11 is successively inserted into the tubular jig 12 as shown by arrow ①.

Figure 3:
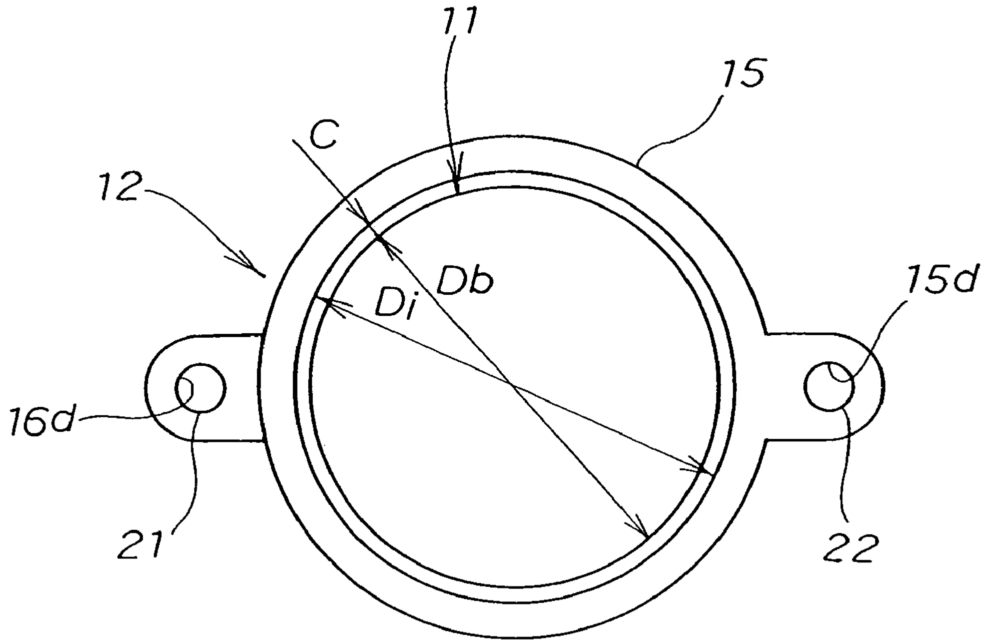
FIG. 3 is a plan view illustrating the billet inserting step.

After the insertion of the billet 11 into the jig, the press plate 13 is placed on the first annular member 15 and the bolts 21 and 22 are fastened as shown in FIG. 3.

The billet 11 is disposed with a clearance C equally provided between the outer peripheral surface of the billet 11 and the inner peripheral surface of the jig 12. The billet 11 may be disposed to partially contact the jig 12.

As has already been mentioned, the jig 12 is provided with the inside diameter Di slightly greater than the outside diameter Db of the billet 11 so as to provide the predetermined radial clearance C between the tubular jig 12 and the billet 11. Specifically, with the coefficient of linear expansion of the billet 11 as β, with the coefficient of linear expansion of the jig 12 as α, with the temperature of the jig 12 and the billet 11 at room temperature as T1, and with the heating temperature as T2, the clearance C is $2\times C<(Db\times\beta-Di\times\alpha)\times(T2-T1)$.

The coefficient of linear expansion a of the jig 12 is $\alpha<\beta$.

To meet those conditions, an aluminum-based composite is used as the material of the billet 11 and austenitic stainless steel as the material of the jig 12. Since the coefficient of linear expansion of the austenitic stainless steel is smaller than the coefficient of linear expansion of the aluminum-based composite, the difference in thermal expansion allows the application of a compressive force to the aluminum-based composite inside the jig 12.

The coefficient of linear expansion of the aluminum-based composite is $19.3\times10^{-6}$/°C., and the coefficient of linear expansion of the austenitic stainless steel (JIS SUS304) is $18\times10^{-6}$/°C.

Figure 4:
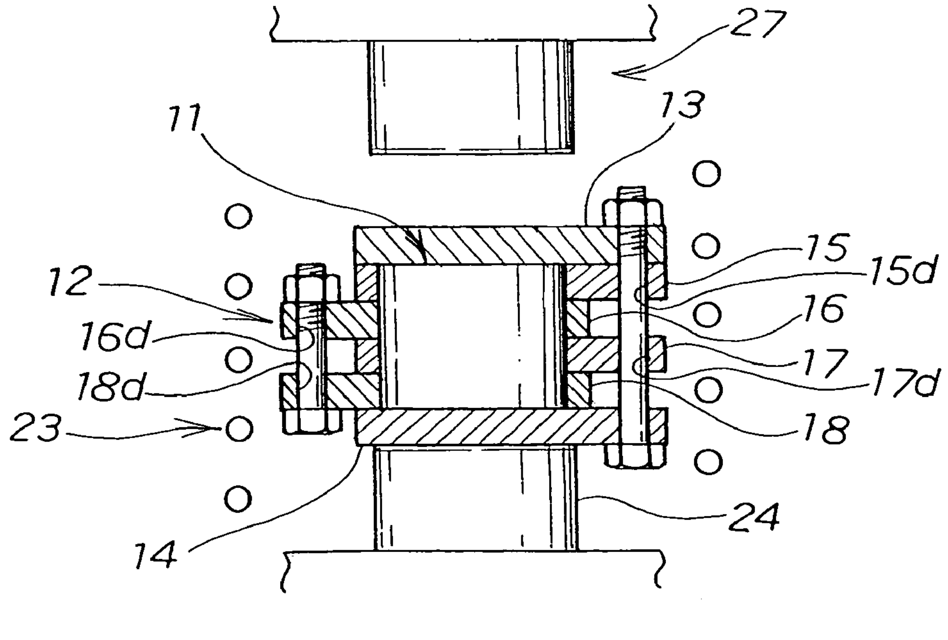
FIG. 4 is a schematic diagram illustrating the step of heating the billet to a half-melting temperature.

In FIG. 4, the billet 11 and the jig 12 are heated with an induction heating means 23 to a temperature half-melting the billet 11. Reference numeral 24 denotes a mount for mounting the jig 12.

In the heating process, when the billet 11 and the jig 12 are heated to a temperature half-melting the billet 11, the billet 11 thermally expands, the difference in expansion from that of the jig 12 brings the outer peripheral surface of the billet 11 into contact with the inner peripheral surface of the jig 12, and the confinement of the jig 12 causes a compressive force on the billet 11. As a result, no sliding in the axis direction occurs in the subsequent cutting step, facilitating the cutting.

Further, since the billet 11 and the jig 12 are heated to a temperature half-melting the billet 11 in the heating step, shearing resistance is reduced in the subsequent cutting step, facilitating the cutting of the billet 11.

In the heating step, the adoption of the induction heating method can shorten the time of heating the billet 11 and also shorten the cycle time of the heating step. Thus provided is an increase in productivity.

The adoption of the induction heating method and the use of austenitic stainless steel as the material of the jig 12 allow the induction heating of only the billet 11 without inductively heating the austenitic stainless steel, providing greater expansion difference, and increasing the compressive stress of the billet 11. As a result, cutting in the following step is facilitated.

Successively, when the billet 11 reaches the half-melting temperature, the induction heating means 23 is removed from the jig 12.

Now, with reference to FIGS. 5A, 5B and 5C, the step of cutting a billet into blanks according to the present invention will be described.

Figure 5A:
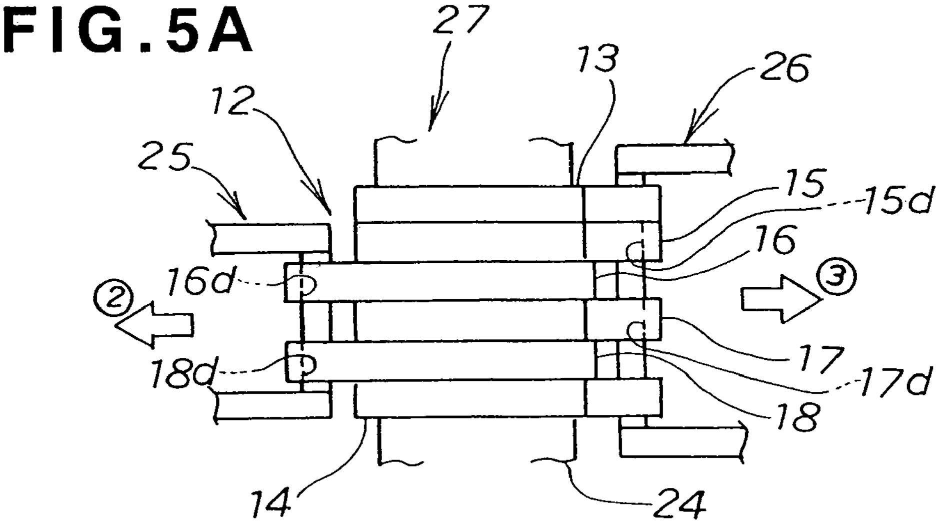
FIGS. 5A to 5C are schematic side views illustrating the step of cutting the billet into blanks.

As shown in FIG. 5A, the jig 12 is used for starting cutting. More specifically, the bolts are removed to fit a pulling jig 25 in the open holes 16*d* and 18*d* and fit a pulling jig 26 in the holes 15*d* and 17*d*. The press plates 13 and 14 on the opposite ends are pressed via a pressure-applying device 27 known by one of ordinary skill in the art to the extent that the press plates 13 and 14 are not tilted when the pulling jigs 25 and 26 are pulled in opposite directions as shown by arrows ② and ③.

Figure 5B:
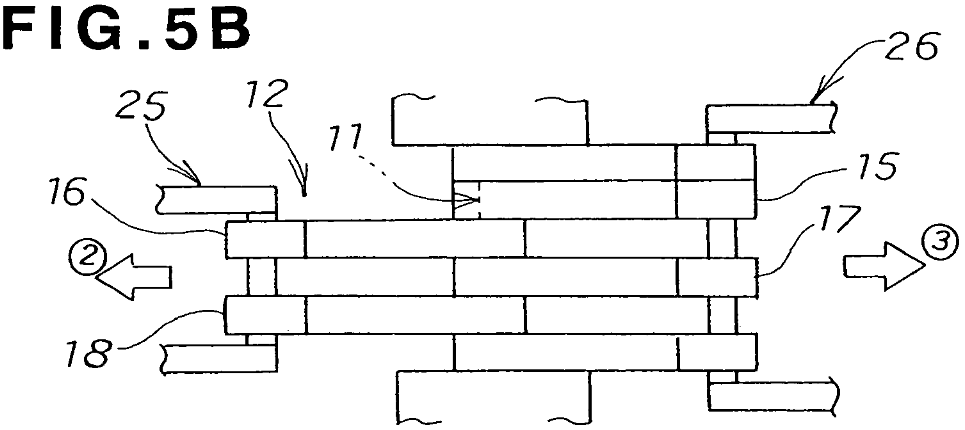

Then, as shown in FIG. 5B, the pulling jigs 25 and 26 are moved in the opposite directions as shown by arrows ② and ③, applying shearing forces to the billet 11 with the jig 12, and cutting the billet 11 into four pieces at a time.

Figure 5C:
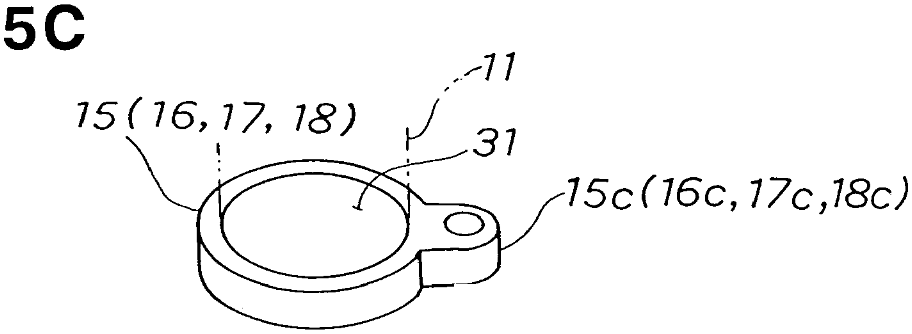

The cut billet 11 provides blanks 31 fitted in the first to fourth annular members 15 to 18 as shown in FIG. 5C.

In this manner, in the process of cutting the billet 11 into the blanks 31, the second and fourth annular members 16 and 18 are pulled leftward (In the direction of arrow ②) and the first and third annular members 15 and 17 adjacent to the second and fourth annular members 16 and 18 are pulled rightward (in the direction of arrow ③), the second and fourth annular members 16 and 18 and the adjacent first and third annular members 15 and 17 being moved in the opposite directions, thereby cutting the billet 11. As a result, the billet 11 can be cut into four pieces at a time, allowing increased productivity.

The second and fourth annular members 16 and 18 and the adjacent first and third annular members 15 and 17 are moved in the opposite directions, thereby cutting the billet 11. As a result, the billet 11 can be cut without using a cutting tool such as a cutter, reducing production cost.

When the material of the blank 31 is an aluminum-based composite, supply cost of cutting tools to be subjected to severe wear for the aluminum-based composite can be eliminated. Thus production cost can be reduced.

Further, since the second and fourth annular members 16 and 18 and the adjacent first and third annular members 15 and 17 are moved in the opposite directions to cut the billet 11, there is no need to provide the billet 11 with a machining allowance for cutting, increasing the yield of the expensive aluminum-based composite, and reducing production cost.

Now with reference to FIGS. 6 and 7, the step of disposing a blank on a press molding device 32 will be described.

Figure 6:
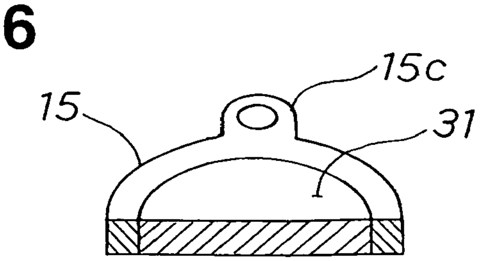
FIG. 6 is a partial schematic diagram of the blank fitted in an annular member before being fed to a press molding device.

The blank 31 is, as shown in FIG. 6, fitted in the first annular member 15 by thermal expansion. With this state, by holding the grip 15*c* of the first annular member 15, the blank 31, together with the first annular member 15, is carried to the press molding device 32.

Similarly, by holding the grips 16*c*, 17*c* and 18*c* of the second to fourth annular members 16 to 18 (see FIG. 5C), the blanks 31, together with the respective second to fourth annular members 16 to 18, are sequentially carried to the press molding device. The first to fourth annular members 15 to 18 may be carried by holding portions other than the grips.

Figure 7:
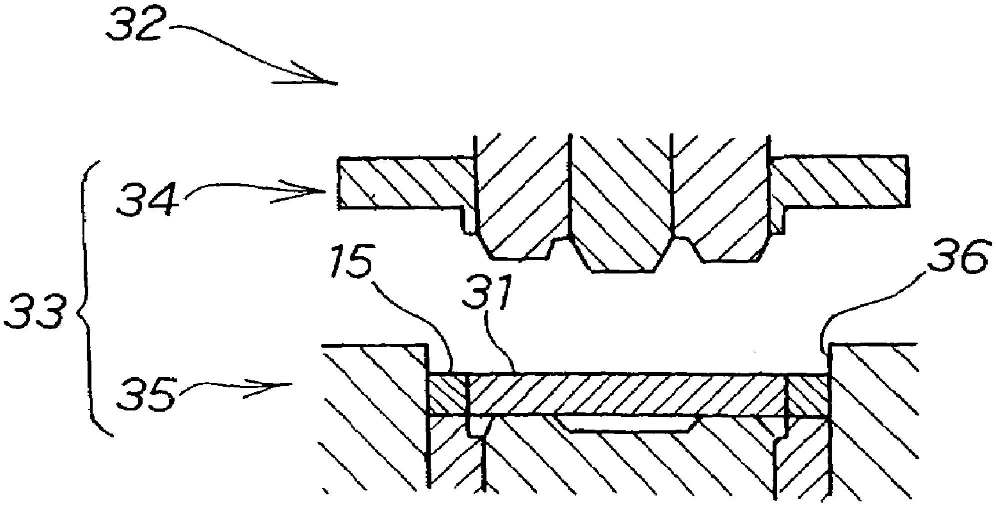
FIG. 7 is a schematic cross-sectional view illustrating the blank, being fitted in the annular member, disposed on a lower mold half of the press molding device.

As shown in FIG. 7, the press molding device 32 includes a mold 33 consisting of an upper mold half 34 and a lower mold half 35. A fitting hole 36 is formed in the lower mold half 35. In the hole 36, the first annular member 15 is fitted. Although the figure only shows the one mold 33, the press molding device 32 has as many molds 33 as the second to fourth annular members with the blanks 31 fitted therein, for receiving them. Since the blanks 31, being fitted in the first to fourth annular members 15, are carried to the press molding device 32 for disposition, cooling time for taking the blanks 31 out of the first to fourth annular members 15 can be eliminated, resulting in increased productivity.

Since the blanks 31, being fitted in the first to fourth annular members 15, are fed to the press molding device 32, time between cutting and feeding is shortened. The temperature of the blanks 31 thus hardly decreases, eliminating the need for reheating the blanks 31 before molding. This allows an increase in productivity.

Figure 8A:
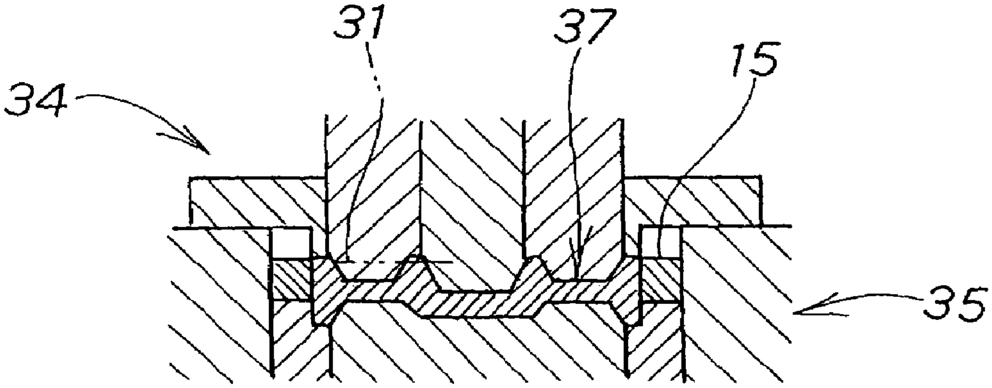
FIG. 8A is a schematic cross-sectional view illustrating the molding of the half-molten blank disposed on the lower mold half in FIG. 7.
Figure 8B:
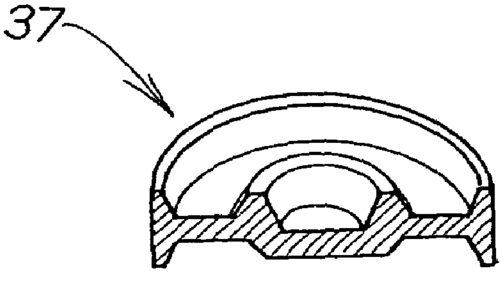
FIG. 8B is a schematic diagram of a molded part resulting from the molding of the half-molten blank in FIG. 8A.

Successively, as shown in FIG. 8A, the upper mold half 34 is lowered for press, forming the blank 31 into a molded part 37 of a desired shape. Then the upper mold half 34 is moved upward to take the first to fourth annular members 15 and the molded parts 37 out of the lower mold half 35. Finally, the molded parts 37 as shown in FIG. 8B are taken out of the press molding device. The molded parts 37 are pulley components in this embodiment.

Now with reference to FIGS. 9A to 10B, the way of disposing annular members with blanks fitted therein on another mold of the press molding device will be described.

Figure 9A:
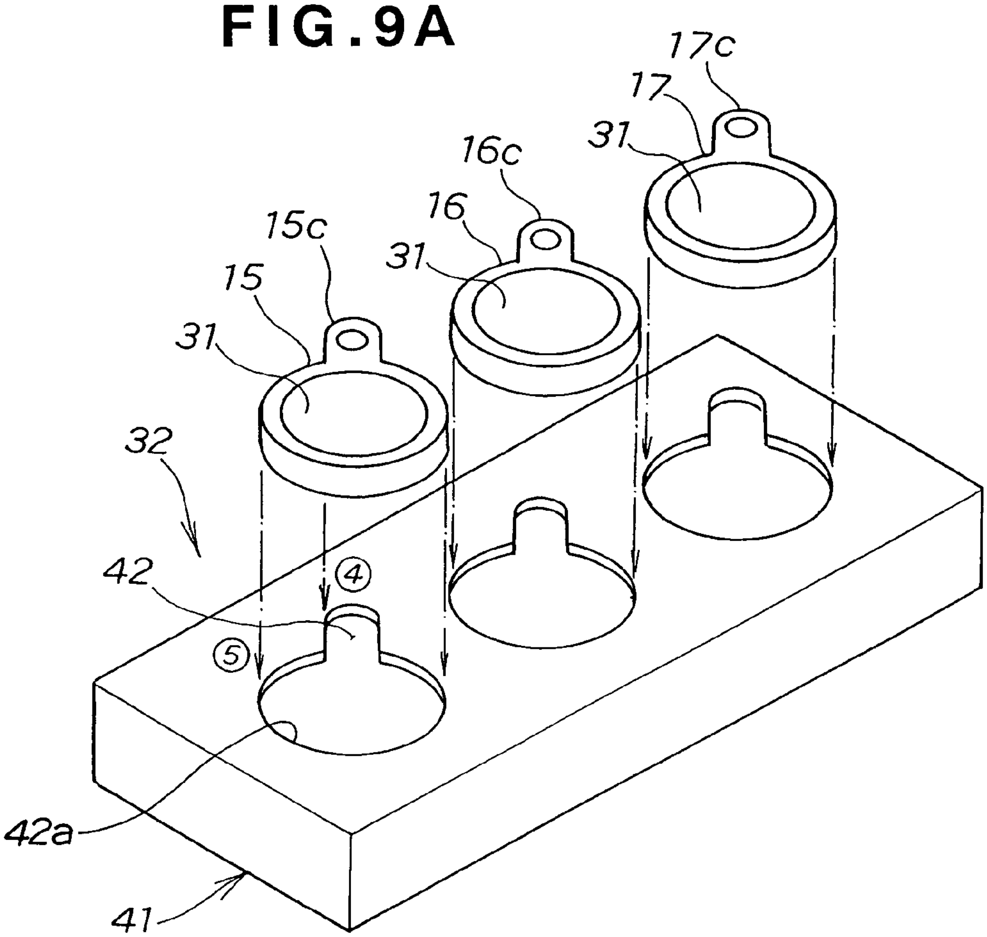
FIG. 9A is a schematic perspective view illustrating the way of disposing blanks on another lower mold half of the press molding device.
Figure 9B:
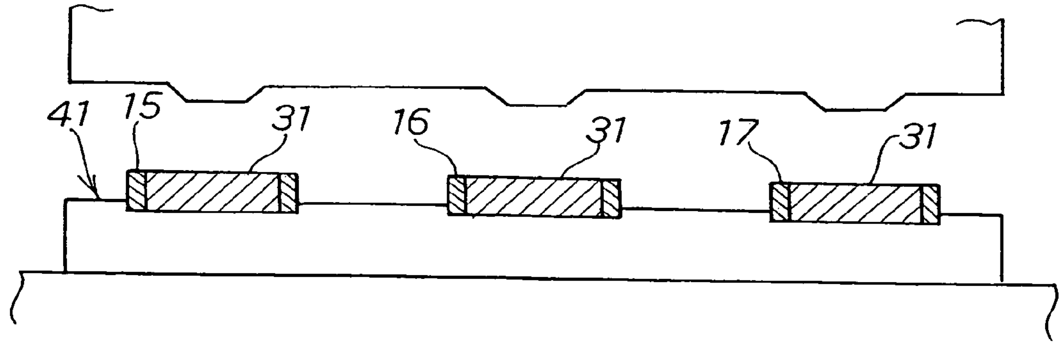
FIG. 9B is a schematic cross-sectional view of the blanks disposed on the lower mold half in FIG. 9A.

As shown in FIG. 9A, the press molding device 32 has a plurality of lower mold halves 41 of a flat shape each having locating portions 42 and fitting holes 42*a*. The blank 31, being fitted in the first annular member 15, is fed to the press molding device 32, and is then positioned with the grip 15*c* inserted in the locating portion 42 as shown by arrow ④, and the first annular member 15 is fitted in the fitting hole 42*a* as shown by arrows ⑤. Similarly, the second annular member 16 is positioned with the grip 16*c* and fitted in the locating portion 42 and the fitting hole 42*a*, and the third annular member 17 is positioned with the grip 17*c* and fitted. As a result, the first to third annular members 15 to 17 with the blanks 31, 31 and 31 fitted therein are disposed on the lower mold half 41 as shown in FIG. 9B.

In this manner, the blanks 31, being fitted in the first to third annular members 15, 16 and 17, are fed to the press molding device 32, and then the grips 15*c*, 16*c* and 17*c* are inserted into the locating portions 42 of the lower mold half 41, which facilitates the positioning of the blanks 31. As a result, the precision of molded parts can be increased without effort, and variation in dimension between molded parts can be prevented, providing stable molding.

In the case of simultaneously molding a plurality of pieces as shown in FIG. 9A, the jig 12 (see FIG. 5B) is used to cut the billet 11 into four pieces at a time as previously described, and then the blanks 31, 31 and 31, being fitted in the first to third annular members 15 to 17, are fed to the press molding device 32, so that the three blanks 31 can be fed substantially at the same time, preventing variation in temperature between the blanks 31.

Figure 10A:
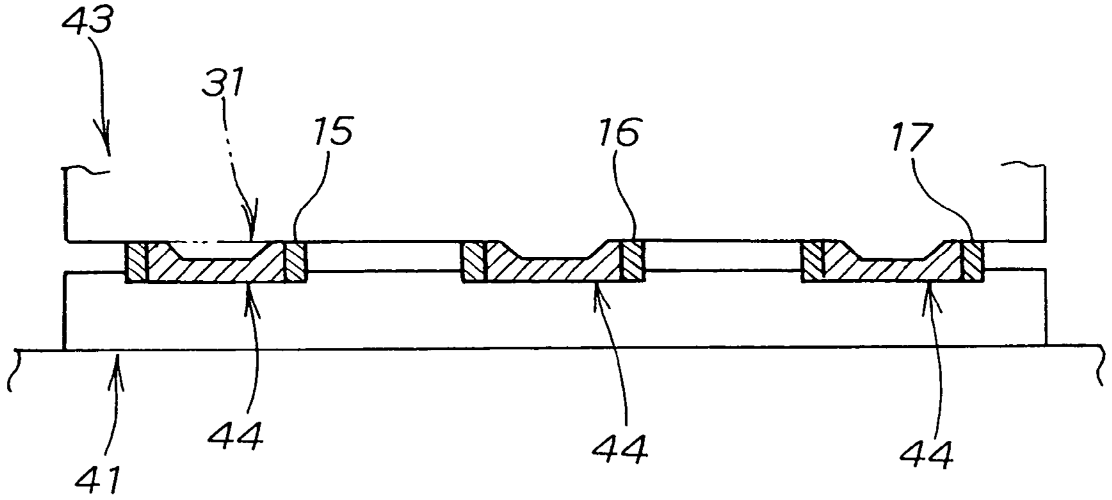
FIG. 10A is a schematic side view illustrating partially in cross-section the molding of the blanks in FIG. 9B.
Figure 10B:
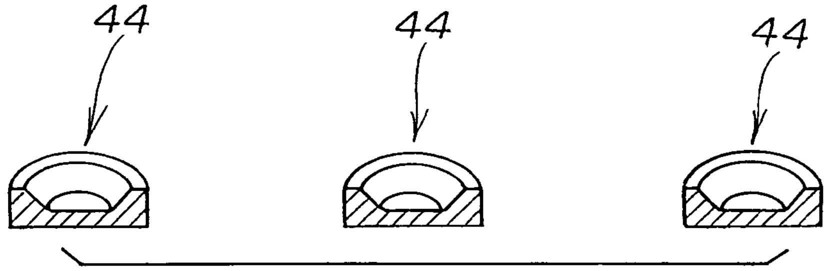
FIG. 10B is a schematic diagram illustrating molded parts resulting from the molding in FIG. 10A.

Successively, as shown in FIG. 10A, an upper mold half 43 corresponding to the lower mold half 41 is lowered thereby forming the blanks 31 into molded parts 44. Thereafter, the completed molded parts 44 as shown in FIG. 10B are taken out of the press molding device. The shape of the molded parts 44 is only an example.

Now, with reference to FIGS. 11A and 11B, the way of disposing an annular member in a modification on still another mold of the press molding device will be described. Components identical to those in the embodiment of FIGS. 2 to 6 are affixed the same reference numerals, and will not be described.

Figure 11A:
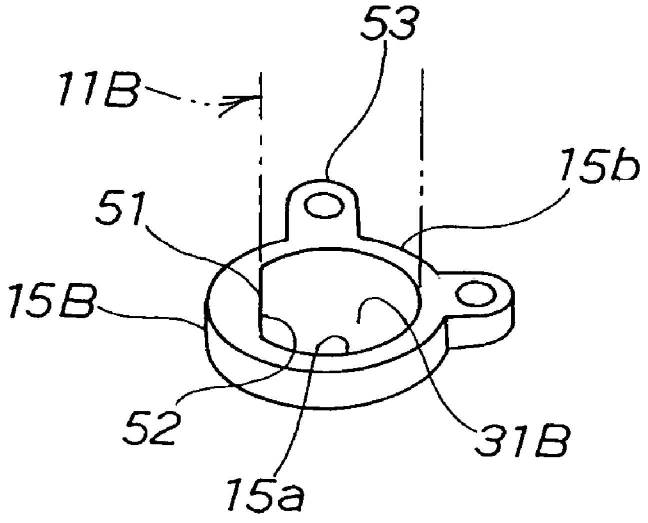
FIG. 11A is a schematic perspective view illustrating an annular member according to a modification, with a blank fitted therein.

As will be clear from FIG. 11A, a billet 11B is cut to obtain a blank 31B fitted in a first annular member 15B. The material of the billet 11B is identical to that of the billet 11. The billet 11B has a plane surface 51 formed by cutting off a part of the circle. The material of the first annular member 15B is identical to that of the first annular member 15. The first annular member 15B has a flat portion 52 formed at an inner peripheral portion 15*a* and a locating portion 53 protruding outward of an outer peripheral portion 15*b*.

Figure 11B:
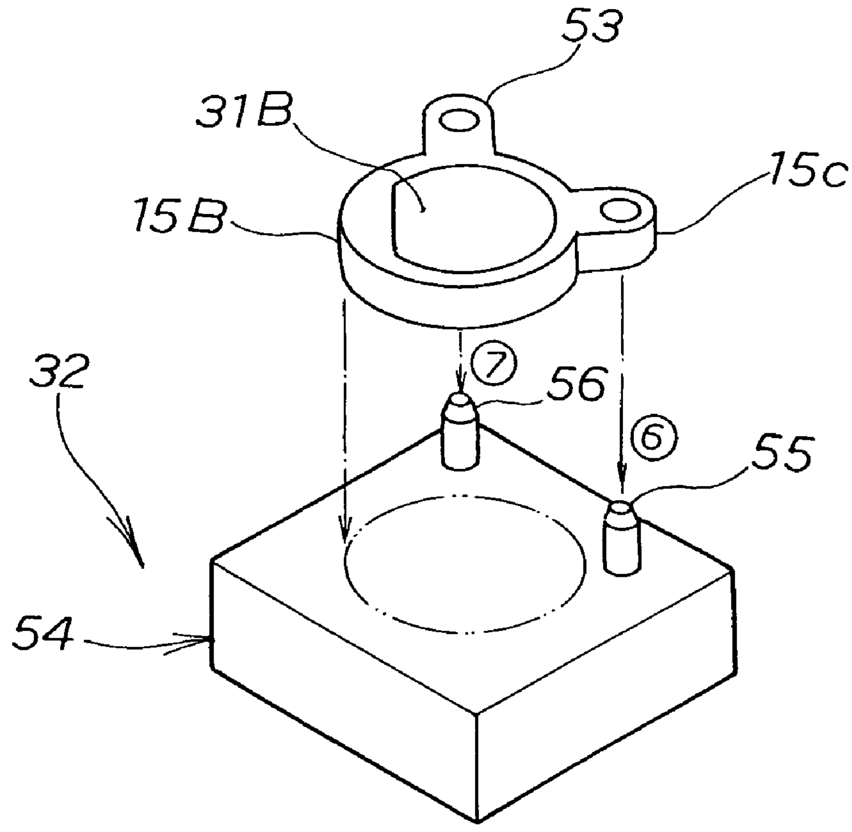
FIG. 11B is a schematic perspective view illustrating the way of disposing the annular member in FIG. 11A on a lower mold half according to another modification.
Figure 12:
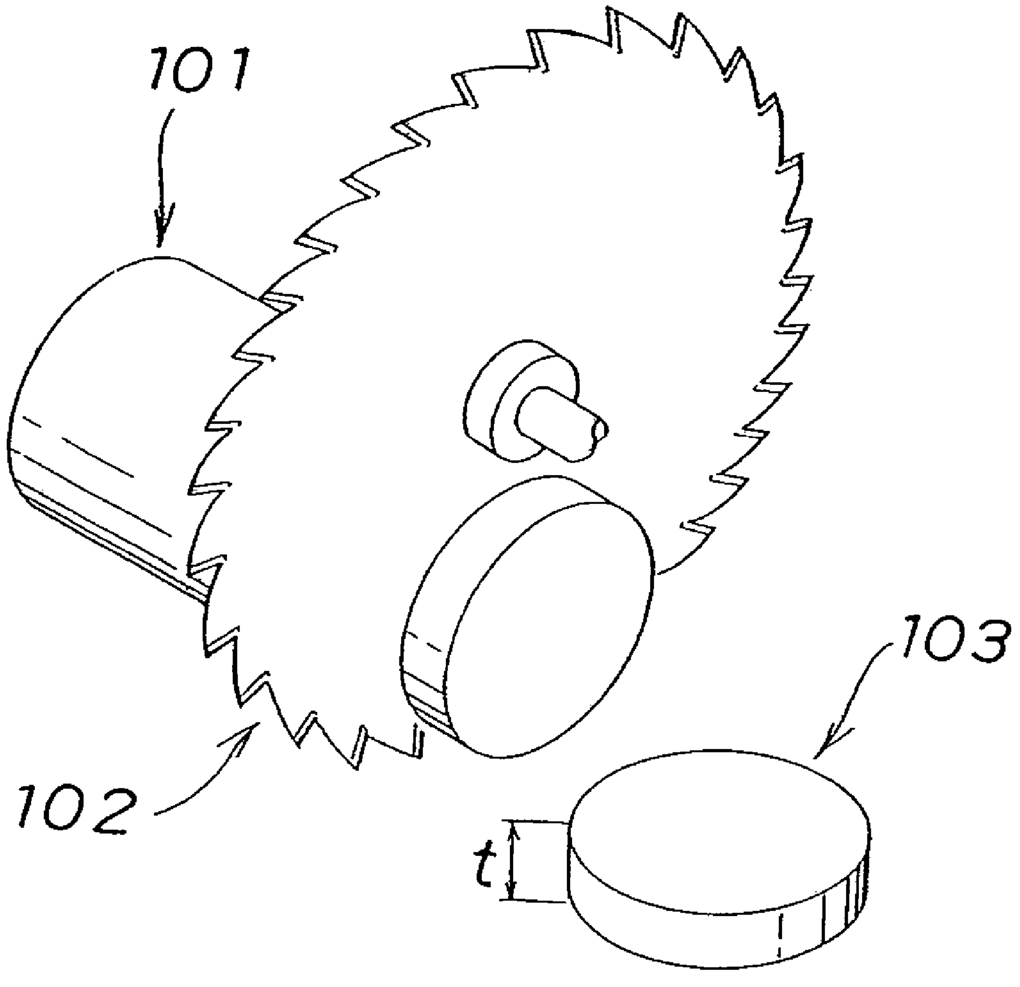
FIG. 12 (PRIOR ART)
FIG. 12 is a schematic perspective view illustrating the conventional billet cutting method.

As shown in FIG. 11B, a press molding device 32 has a lower mold half 54. The lower mold half 54 has two locating pins 55 and 56 extending upward from the top surface. The blank 31B, being fitted in the first annular member 15B, is carried to the press molding device 32, and then a grip 15*c* of the annular member 15B is fitted onto the locating pin 55 of the lower mold half 54 as shown by arrow ⑥, and the locating portion 53 of the annular member 15B is fitted onto the locating pin 56 of the lower mold half 54 as shown by arrow ⑦. Thereafter, the blank 31B fitted in the annular member 15B is molded into a desired shape in a manner as described above.

The positioning of the blank 31B in this modification also provides effects similar to those in the above-described embodiment.

The configuration of the induction heating means 23 in FIG. 4 is an example. A special furnace, for example, may be used.

The composition of the aluminum-based composite can be any, and may be made by dispersing alumina ($Al_2O_3$) powder in a molten aluminum alloy.

The first to fourth annular members 15 to 18 are superimposed on one another to assemble the tubular jig 12. The number of the annular members is not limited to four and can be any.

The billet 11 is cut into four pieces with the jig 12 at a time. The number of cut pieces can be any.

The shape of the first to fourth annular members 15 to 18 can be any. For example, the inner periphery formed with the inside diameter Di may be formed in a polygon, and the outer periphery may be formed in a polygon.

The configuration of the mold 33 in FIG. 7 is an example. The shape of the fitting hole 36 formed in the lower mold half 35 is an example.

INDUSTRIAL APPLICABILITY

As will be apparent from the above, the blank feeding method according to the present invention eliminates the need for a cutting tool for cutting a billet, causing no wear of blades, and thus allowing reduced production cost of blanks for producing parts, and also feeds a plurality of blanks at a time without the need for reheating, thus allowing increased productivity of blanks. The present invention is thus beneficial to parts-producing fields.

What is claimed is:

1. A method of feeding a blank by cutting a billet, comprising the steps of:

superimposing a plurality of annular members on one another to assemble a tubular jig, said plurality of annular members having a coefficient of linear expansion that is smaller than a coefficient of linear expansion of said billet, said plurality of annular members having an inside diameter that is slightly greater than an outside diameter of said billet;

inserting said billet into said assembled jig;

heating said billet and said assembled jig to a temperature at which said billet is half-molten;

cutting said billet into at least one blank by moving adjacent ones of said annular members in opposite directions; and placing said at least one blank on a press molding device with the blank fitted in the annular member.

2. The blank feeding method as set forth in claim 1, wherein said press molding device has a mold half having fitting holes for receiving said plurality of annular members with said blanks fitted therein, and said blank placing step comprises fitting said plurality of annular members into said fitting holes.

3. The blank feeding method as set forth in claim 1, wherein said annular member has a grip protruding outward of an outer peripheral surface, and said blank placing step includes carrying said annular member to said press molding device by holding said grip.

4. The blank feeding method as set forth in claim 1, wherein said heating is performed by an induction heating method.

5. The blank feeding method as set forth in claim 1, wherein said billet is formed from an aluminum-based composite.

6. The blank feeding method as set forth in claim 1, wherein said jig is formed from austenitic stainless steel.

* * * * *